United States Patent
Chertok

(10) Patent No.: US 7,141,988 B2
(45) Date of Patent: Nov. 28, 2006

(54) CAPACITIVE POSITION SENSOR AND SENSING METHODOLOGY

(75) Inventor: Allan Chertok, Bedford, MA (US)

(73) Assignee: Tiax LLC, Cambridge, MA (US)

( * ) Notice: Subject to any disclaimer, the term of this patent is extended or adjusted under 35 U.S.C. 154(b) by 0 days.

(21) Appl. No.: 10/883,390

(22) Filed: Jul. 1, 2004

(65) Prior Publication Data

US 2005/0030049 A1    Feb. 10, 2005

Related U.S. Application Data

(60) Provisional application No. 60/484,520, filed on Jul. 1, 2003.

(51) Int. Cl.
*G01R 27/26* (2006.01)

(52) U.S. Cl. .................... 324/661; 324/662

(58) Field of Classification Search ........ 324/660–663, 324/686, 690; 73/116–120
See application file for complete search history.

(56) References Cited

U.S. PATENT DOCUMENTS

| | | | |
|---|---|---|---|
| 3,564,397 A | 2/1971 | Sargent et al. ................ 323/93 |
| 3,928,796 A | 12/1975 | Kaiser ....................... 324/61 R |
| 4,408,456 A * | 10/1983 | Rauch ........................... 60/518 |
| 4,557,509 A | 12/1985 | Giebeler ..................... 285/281 |
| 4,587,850 A | 5/1986 | Moser ......................... 73/658 |
| 4,638,670 A | 1/1987 | Moser ......................... 73/658 |
| 4,788,489 A | 11/1988 | Kobayashi et al. ......... 324/61 P |
| 4,837,500 A | 6/1989 | Abbringh ...................... 324/61 |
| 4,862,063 A | 8/1989 | Kobayashi et al. ......... 324/61 P |
| 4,951,048 A | 8/1990 | Ichikawa et al. ............. 341/15 |
| 4,961,055 A | 10/1990 | Habib et al. ................ 324/662 |
| 5,197,429 A | 3/1993 | Kita ............................ 123/357 |
| 5,239,307 A | 8/1993 | Andermo ............... 340/870.37 |
| 5,317,351 A | 5/1994 | Takahara et al. ......... 354/195.1 |
| 5,418,468 A | 5/1995 | Baker et al. ................. 324/674 |
| 5,528,928 A | 6/1996 | Baker et al. ................... 73/116 |
| 5,585,733 A | 12/1996 | Paglione ..................... 324/678 |
| 5,708,367 A | 1/1998 | Tousson ..................... 324/660 |
| 5,844,415 A * | 12/1998 | Gershenfeld et al. ....... 324/663 |
| 5,895,844 A * | 4/1999 | Krueger ................... 73/119 A |
| 6,084,320 A | 7/2000 | Morita et al. ................. 310/12 |
| 6,094,912 A | 8/2000 | Williford ..................... 60/520 |
| 6,185,829 B1 | 2/2001 | Geisel ........................ 33/1 PT |
| 6,293,303 B1 | 9/2001 | Mori et al. ................. 137/554 |
| 6,346,818 B1 | 2/2002 | Wilson et al. .............. 324/658 |
| 6,382,246 B1 * | 5/2002 | Mori et al. ................. 137/554 |
| 6,448,792 B1 * | 9/2002 | Yoshida et al. ............. 324/674 |
| 6,499,461 B1 | 12/2002 | Kubota et al. .............. 123/361 |
| 6,504,385 B1 * | 1/2003 | Hartwell et al. ............ 324/662 |

(Continued)

FOREIGN PATENT DOCUMENTS

DE    35 18 858    11/1985

(Continued)

*Primary Examiner*—Diane Lee
*Assistant Examiner*—Marina Kramskaya
(74) *Attorney, Agent, or Firm*—Lowrie, Lando & Anastasi, LLP

(57) ABSTRACT

A simple and robust variable coaxial capacitive sensor and detection method for monitoring the position of a rapidly reciprocating member such as a piston or displacer in a free piston Stirling engine. The coaxial capacitor of the present invention in a preferred embodiment thereof is configured to modulate capacitive electrode area rather than inter-electrode spacing and as a result a highly linear transfer function can be achieved. Also disclosed are detection methods which derive and process signals in connection with applications which have small sensor capacitance variations while suppressing stray capacitance error.

26 Claims, 7 Drawing Sheets

U.S. PATENT DOCUMENTS

| | | | |
|---|---|---|---|
| 6,530,756 B1 | 3/2003 | Morita et al. | 417/417 |
| 6,772,087 B1 * | 8/2004 | Sasaki | 702/150 |
| 6,781,387 B1 * | 8/2004 | Goldfine et al. | 324/658 |
| 6,856,107 B1 * | 2/2005 | Daboussi | 318/135 |
| 6,861,848 B1 * | 3/2005 | Kasai et al. | 324/661 |
| 2001/0030544 A1 | 10/2001 | Wilson et al. | 324/658 |

FOREIGN PATENT DOCUMENTS

| | | |
|---|---|---|
| DE | 42 05 048 | 8/1993 |
| DE | 44 10 363 | 9/1995 |
| GB | 1 601 572 A | 10/1981 |
| JP | 60252833 A | 12/1985 |
| JP | 03225203 A | 10/1991 |
| JP | 04305107 A | 10/1992 |
| JP | 05113304 A | 5/1993 |

* cited by examiner though this approach is generally
effective, it does suffer from a number of drawbacks. First,
it requires additional electromechanical devices and control
circuitry which adds to cost and complexity. Additionally,
response time to load variations can be slow due to the
inertia of the mechanical parts.

In a second class of solutions to the problem of piston and
displacer amplitude control, an active approach may be
employed wherein piston and/or displacer position is measured and system control is accomplished based thereon. In
the case where an FPSE is driving a linear alternator, the
voltage induced in the armature of the alternator may be
used to ultimately determine piston position. Typically, this
is achieved by obtaining stroke amplitude through armature
induced voltage.

This class of solutions also suffers from drawbacks. In
particular, there exists a load current dependent voltage drop
due to resistance and inductance in the armature windings.
Moreover, the strength of the alternator field magnets which
directly impacts the induced armature voltage will change
with temperature and over time. Resistance and inductance
voltage drops must be accounted for in terms of the position
calculation since load current is flowing during the actual
measurement of the observable alternator terminal voltage.
While recoverable magnet strength variation with temperature might also be compensated for if magnet temperature
can be estimated, it is difficult to account for variation due
to magnet aging. Further, if magnets reach a temperature at
which there is a pronounced "knee" in their operating B-H
characteristic they may be subject an unrecoverable loss of
strength when exposed to a strong armature reaction field.
Such weakening is not readily detected and can cause a
significant understatement of piston excursion leading to
damaging impacts. Unfortunately, in many prior art solutions, the voltage drop and field magnet strength variation is
not accounted for and inaccurate data results. Alternatively,
in order to account for the voltage drop, additional control
circuitry and calculations must be performed.

Many prior art methods for monitoring the position of
reciprocating members employ magnetic, electromagnetic
and optical sensing technologies. Piston position monitoring
solutions employing these prior art methods, which are
adequately robust and stable with time and temperature
fluctuations may be too costly to implement. In general
terms, capacitive sensors are known and it is further known
that these sensors may be used to determine lateral positioning including in connection with position sensing for
reciprocating members. For example, Moser, in U.S. Pat.
No. 4,587,850 discloses an apparatus for detecting and
measuring the motion of a piston in a cylinder through the
use of a variable impedance comprising a dielectric moving
between the fixed electrodes of a capacitive structure. The
use of a variable capacitive structure in determining position
is based upon the premise that capacitance changes based
upon the positional relationship of the electrodes. In most
cases, capacitive change is based upon a change in the
distance between the two electrodes which is inversely
proportionally to the resulting capacitance.

Unfortunately, because the relationship between interelectrode distance and capacitance is non-linear, difficulties
may arise in connection with sensors based upon this
relationship. In particular, capacitances may be extremely
small in practical application and simultaneous accommodation of such a small variation at one position extreme and
a much larger one at the other, due to the inverse non-linear
position-capacitance relationship, may result in troublesome
inaccuracies in sensor measurement and resulting control

CAPACITIVE POSITION SENSOR AND SENSING METHODOLOGY

RELATED APPLICATIONS

This patent application claims priority from Provisional Application Ser. No. 60/484,520, filed on Jul. 1, 2003, the contents of which are hereby incorporated by reference.

FIELD

The present invention relates to reciprocating members such as pistons and more particularly to devices and methods for instantaneously monitoring the position thereof.

BACKGROUND

Various applications call for the sensing and resultant determination of position with respect to rapidly reciprocating members. Exemplary classes of such reciprocating members include pistons in free piston internal combustion engines, hydraulic and pneumatic cylinders and pistons and displacers in free piston Stirling engines (FPSEs) or compressors.

Although traditional internal combustion engines are in widespread use and have many advantages, the exhaust emissions associated with these engines can often exceed acceptable levels. In addition, these engines can be overly noisy and require frequent maintenance. Stirling engines represent improvements in these areas since they are extremely efficient and quiet in operation and they may be configured to generate virtually no emissions whatsoever.

A common application associated with Stirling engines is to generate electrical energy from heat energy by means of a free piston Stirling engine (FPSE) driving a linear alternator. In practical application of these types of arrangements, the power demand of the electrical load varies substantially during normal operation due to variations in load impedance and connection and disconnection of some or all of the loads. In addition, operating temperature and other variables may change during operation so as to result in small and not so small changes in power demand over time.

Attainment of optimal free piston engine alternator plant efficiency over a broad range of electrical power demand and engine temperature conditions requires control of power piston displacement. Not only is it desirable to maintain optimal plant efficiency by continuous adjustment of power piston displacement according to electrical load and engine temperature conditions, but it is also critical to maintain the stroke amplitude of the Stirling engine within safe limits. If the load imposed on an FPSE is suddenly reduced by a substantial amount, the stroke amplitude of the engine will be suddenly correspondingly increased. If the increase in amplitude is great enough, the piston can strike the end of its cylinder resulting in unrecoverable engine failure due to deformation of the piston and possibly the cylinder. On the other hand, if the load is substantially and suddenly increased, the stroke amplitude may be suddenly decreased to the point where the engine can no longer oscillate.

To date, there have been two primary solutions to these potential problems. In the first case, the piston stroke is caused to be essentially self-limiting. According to one approach, the displacer is mechanically driven by the oscillating motion of a linear electric motor. In this way, drive parameters such as displacer stroke amplitude are controlled in order to indirectly control piston stroke amplitude and operations. As a result, these types of sensors may require costly and complex additional corrective signal processing.

In addition to problems that arise in connection with sensing itself, other difficulties in prior art solutions have arisen with respect to signal processing once sensing has been completed. For instance, small sensor capacitance variations on the order of, for example, plus or minus 25 pF which can result from inter-electrode spacing changes ranging from, for example 1–20 millimeters, can be difficult to transmit and process. This is due to many factors, including, for example, the capacitance error introduced by the fact that the transmitting cables themselves have a baseline capacitance which may vary with cable flexing. Additionally, stray capacitance error is easily introduced and can be very troublesome in connection with signal processing when operational variance is small.

SUMMARY

One aspect is to provide a sensor device and methodology for monitoring the instantaneous position of a reciprocating member within a variety of systems and applications.

Another aspect is to provide such a sensor which is cost efficient, reliable and accurate.

Yet another aspect is to provide such a sensor which may be used in connection with a piston or displacer in a FPSE.

A still further aspect of the present invention is to provide a sensor device and methodology which functions based upon capacitive change and which operates using a highly linear transfer function and is insensitive to interconnecting cable and stray capacitance.

A preferred form of the sensor of the present invention includes various embodiments. One such embodiment includes a simple and robust variable coaxial capacitive sensor and detection method for monitoring the position of a rapidly reciprocating member such as a piston or displacer in an FPSE. The coaxial capacitor of the present invention in a preferred embodiment thereof is configured to modulate capacitive electrode area rather than inter-electrode spacing and as a result a highly linear transfer function can be achieved. Also disclosed are detection methods which derive and process signals in connection with applications which have small sensor capacitance variations while suppressing stray capacitance error.

According to one embodiment hereof, the sensor of the present invention is constructed such that a pair of coaxial tubes constitute the capacitive structure. In one embodiment, the inner tube is fixed in place while the outer tube is free to move in the axial direction. The outer tube, may be, for example, attached to a piston or a displacer or a component thereof. Both tubes are formed to include conductive material which functions as the electrode surfaces. As the outer tube moves in the axial direction with respect to the fixed inner tube, the area defined by the overlap of the tube surfaces changes and a direct correlation with capacitive change results. By thus measuring capacitive change as taught herein, the position of a reciprocating member or other moving part attached to the outer tube may be accurately and efficiently measured and determined.

The sensor of the present invention offers a number of advantages relative to the prior art. For example, the sensor disclosed herein is very simply constructed. It requires no optical or magnetic elements and may also employ one or more existing components as either or both of the fixed or moving electrodes. An additional advantage arises from the fact that the sensor capacitance according to the teachings of the present invention is governed only by geometry of the overlapping electrodes. As a result, the accuracy of the measurement is not impacted by component aging and the resulting physical property component changes as is the case with magnetic and electro-optical methods.

Other embodiments of the present invention are also possible as described in further detail below and as will be understood by one of skill in the art. For example other configurations for the electrodes are possible as are variations in the manner in which the electrodes move with respect to one another.

BRIEF DESCRIPTION OF THE DRAWINGS

The invention will now be described in more detail with reference to preferred forms of the invention, given only by way of example, and with reference to the accompanying drawings, in which.

DETAILED DESCRIPTION OF THE PREFERRED EMBODIMENTS

Reference is now made to the embodiments illustrated in FIGS. 1–7 wherein like numerals are used to designate like parts throughout.

Figure 1:
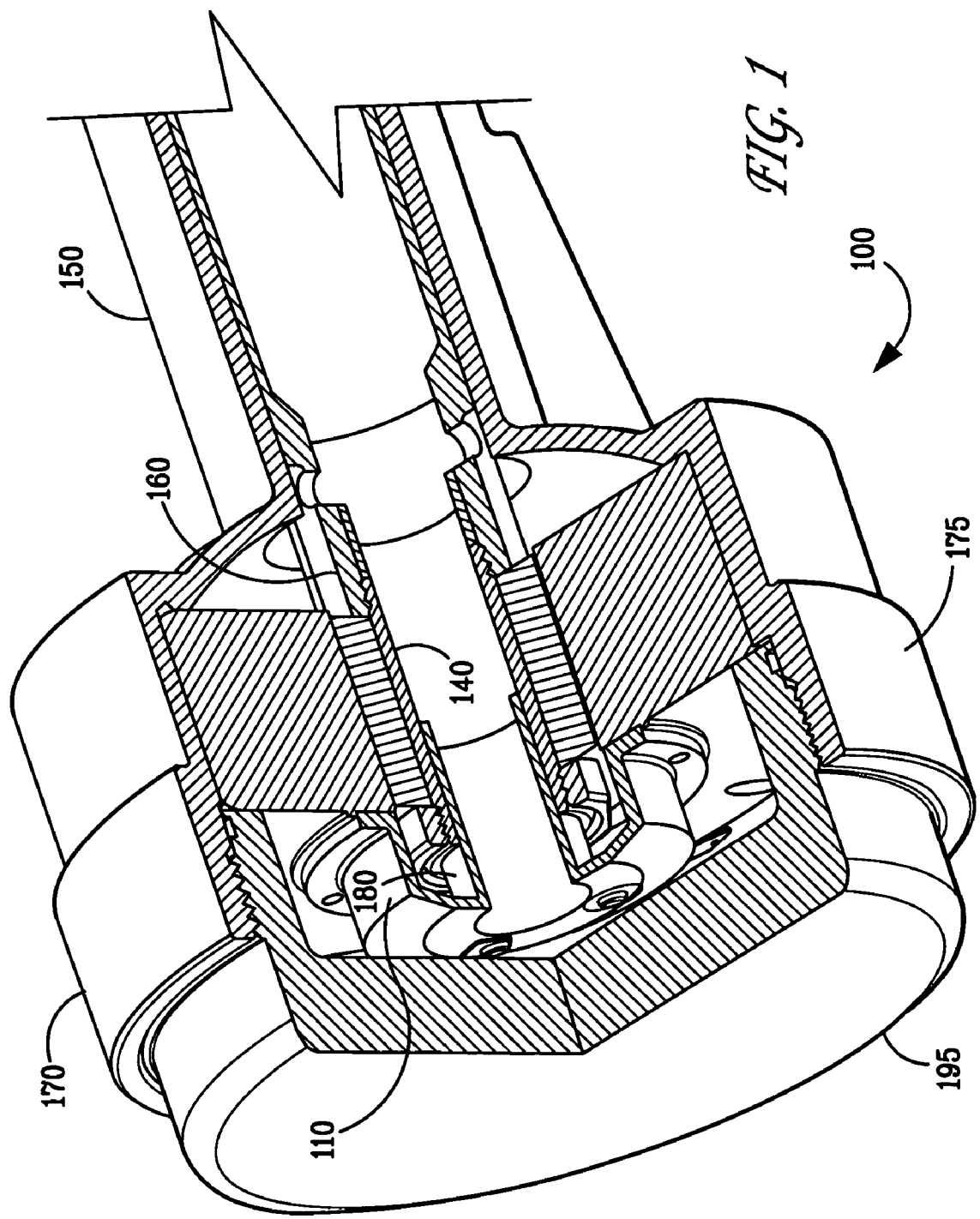
FIG. 1 is a cutaway view of a capacitive sensor according to the present invention as embodied in a piston, cylinder and alternator assembly.
Figure 2:
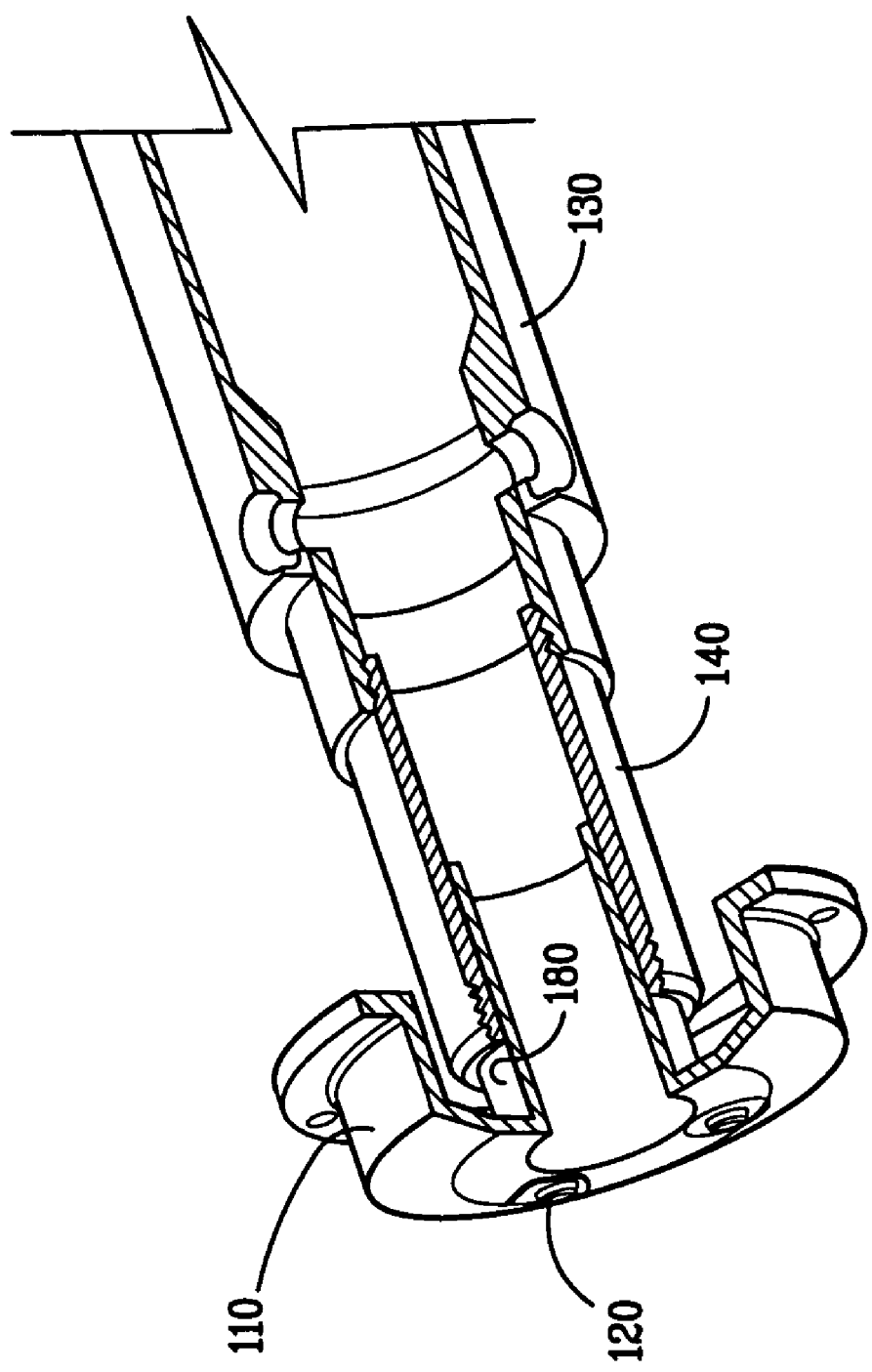
FIG. 2 is a more detailed cutaway view of the capacitive sensor assembly shown in FIG. 1.
Figure 3:
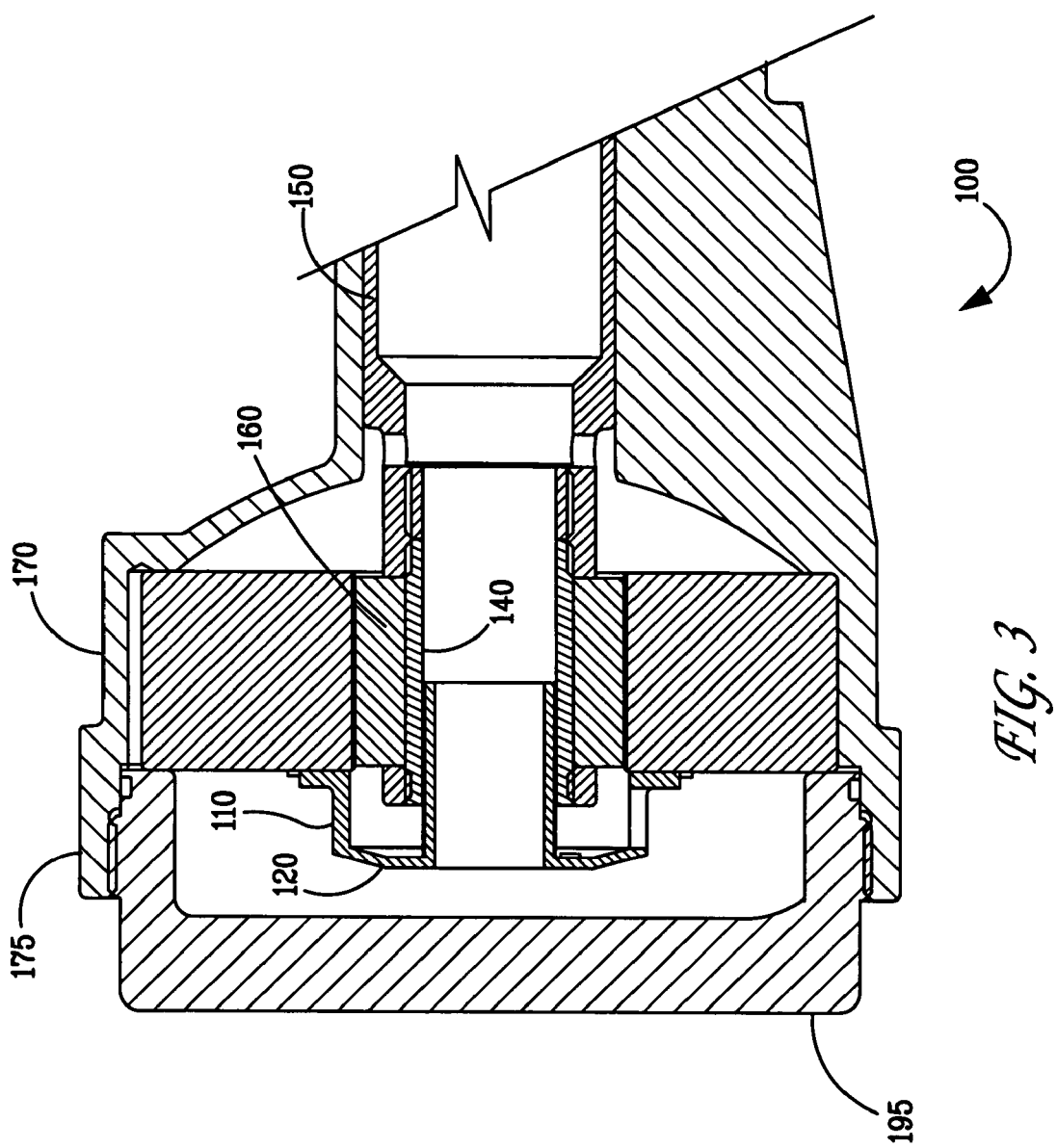
FIG. 3 is a cross-sectional view of the capactive sensor of the present invention according to one embodiment thereof.

FIGS. 1, 2 and 3 illustrate the capacitive sensor of the present invention. As will be understood by one of skill in the art, the teachings of the present invention are not necessarily limited to Stirling engines, to pistons or to the particular sensing environments disclosed herein. In particular, the particular sensor structure and the signal conditioning methodologies taught herein have wide application and may be implemented in a number of environments and applications. The scope of the present invention is to be limited only by the claims appended hereto.

According to a preferred embodiment of the present invention, the capacitive sensor of the present invention is employed in conjunction with an FPSE driving an alternator for conversion from mechanical into electrical energy. Piston/alternator assembly 100 is merely one application in which the capacitive sensor and signal conditioning techniques of the present invention may be applied. The accompanying description is provided for explanatory purposes only and the invention should not be construed as being limited thereto.

In connection with this exemplary embodiment, piston 130 reciprocates in cylinder 150. In this embodiment, piston 130 may be one of multiple pistons contained within assembly 100 or it may be the only piston in the assembly 100. The electrical energy generating alternator 170 includes sleeve 140. Sleeve 140 serves as the moving capacitor electrode, which is also referred to herein as the outer electrode and which is described in greater detail below. In one embodiment, sleeve 140 may also function to support one or more alternator ring magnets 160 contained within the alternator. In this case, assembly 100 with the novel capacitive sensor of the present invention can be created via a retrofit of an existing engine/alternator combination.

The piston/alternator assembly 100 further includes a fixed electrode 180 which is formed from a non-conducting material such as, for example, a plastic. As described below, a conductive plating is applied to specific portions of fixed electrode 180. In one embodiment, plastic may be used as the material for fixed electrode 180 provided that the particular plastic selected is suitable for electroplating with a conducting material, for example, copper.

Fixed electrode support 110 may be formed as an extension of fixed electrode 180 and it may further contain holes for use in fastening fixed electrode 180 and fixed electrode support 110 to the alternator body. Fixed electrode support 110 is preferably formed from a non-conducting material such as a plastic. The fixed electrode support 110 and fixed electrode 180 combination is preferably formed as a tube with a flange as is shown in FIG. 2. The outer surface of the tube representing fixed electrode 180 is coated with a conducting material such as copper. Further, the inner surface and base of the flange portion representing fixed electrode support 110 is also plated with a conducting material such as copper. The rest of the fixed electrode support/fixed electrode component remains generally non-conducting and is particularly designed to electrically isolate fixed electrode 180 from guard electrode 120 as well as isolate both of these electrodes from the alternator and engine structures which are maintained at a ground potential.

Guard electrode 120, which is included as part of fixed electrode support structure 110, is included to minimize stray capacitance error as is described in greater detail below. In a preferred embodiment of the present invention, guard electrode 120 is connected to a shield driver circuit which maintains guard electrode 120, as well as an interconnecting cable shield, at the same potential as fixed electrode 180 thereby inhibiting any current flow-through capacitances between these elements and fixed electrode 180 which serves to negate their impact on the accuracy of the sensing method. All alternator components as well as a portion of piston 130, inner electrode 180 and outer electrode 140 are contained within alternator housing 175.

According to the teachings of the present invention, as piston 130 reciprocates within cylinder 150, outer electrode 140, which is directly affixed to piston 130 is caused to move in the axial direction towards and away from end cap 195 at the top of alternator housing 175. This reciprocating movement translates into relative movement between fixed electrode 180 and outer electrode 140 such that the amount of overlap between outer electrode 140 and fixed electrode 180 varies over time during engine operation. As outer electrode 140 moves back and forth over the fixed inner electrode 180, the area of the capacitive structure formed by fixed electrode 180 and outer electrode 140 varies resulting in a change in the capacitive properties of the capacitive sensor as described in further detail below.

As can be seen in FIGS. 1, 2 and 3, both fixed electrode 180 and outer electrode 140, in a preferred embodiment of the present invention, are cylindrical in shape and are essentially hollow. The outer diameter of fixed electrode 180 is smaller than the inner diameter of outer electrode 140 in order to permit outer electrode 140 to freely move back and forth while encompassing varying lengths of fixed electrode 180 within the interior of outer electrode 140. As will be apparent to one of skill in the art in connection with a review of this specification, it is not necessary that the fixed and moving electrodes associated with the capacitive position sensor of the present invention be formed as co-axial hollow cylinders. Instead, the only requirement is that the two electrodes together form a capacitive structure having an capacitance determining area aspect which varies according to the displacement of the moving member to be monitored. For example, and not by way of limitation, it is also possible to practice the present invention using electrodes with other shapes such as flat plates, square tubes, and round tubes. The respective electrodes may or may not be co-axial (i.e. they overlap with each other in the axial direction) and they may be of various sizes depending upon the particular environment in which the position of a reciprocating member is to be sensed.

In a preferred embodiment of the present invention in which co-axial cylinders are used as the capacitor electrodes in connection with piston/alternator assembly 100, the outer diameter of fixed electrode 180 may be, for example 24 mm and the inner diameter of outer electrode 140 may be, for example, 24.5 mm. This results in a nominal air gap between the outer surface of fixed electrode 180 and the inner surface of outer electrode 140 of 0.25 mm. Further, in a preferred embodiment, the nominal length of the overlap between electrodes at mid engagement is 20 mm with a movement range of approximately 10 mm either way resulting in a capacitor length range of from 10 mm at full disengagement to 30 mm at full engagement. Of course, other lengths, ranges, air gaps and other capacitive characteristics may be used without departing from the scope or spirit of the present invention.

It will be understood by one of skill in the art that differential thermal expansion of the fixed and moving cylinder diameters can alter the gap dimension and, as a result, introduce measurement error over time and during exposure to various conditions including typical engine operating conditions. For example, a differential in coefficient of thermal expansion of 5 ppm/° C. acting on tubular electrodes of 25 mm would cause the 0.25 mm gap to change by +/−0.005 mm (+/−2%) for a +/−40° C. temperature swing.

In order to address this issue, it is possible to employ a fixed electrode 180 fashioned as a metal tube rather than a metal plated plastic tube as described above. In any event, the selected material for the fixed electrode 180 should match the material used for that of moving electrode 140. Alternatively, different materials with the same or closely similar coefficients of thermal expansion may be used.

Alternative embodiments are possible with respect to the construction of fixed electrode 180 and the related fixed electrode support structure 110. Instead of a non-conducting tube plated selectively with a conducting material such as copper, an alternative embodiment calls for using a tube formed from conductive material such as steel or some other metal which is selectively coated with a non-conducting material such as a TEFLON® coating or XYLAN® coating or other similar coatings.

Now that the structure of the capacitive sensor and related components of the present invention has been described, the following discussion provides specific information regarding the operation thereof. In one embodiment of the present invention, the capacitive sensor is embodied in a piston contained within a Stirling engine. As discussed above, it is highly desirable in Stirling engine operation for piston motion to be monitored and controlled. Monitoring may be accomplished through the use of the capacitive position sensor of the present invention. Based upon the piston motion and particularly the instantaneous position of the piston as determined through the teachings of the present invention, various control parameters as known in the art, for example in connection with the operation of a Stirling engine, may be adjusted through a controller to maximize efficiency and obtain desired operational characteristics. By way of example only, fuel flow rate may be selectively adjusted based upon the measurement of piston position according to the teachings of the present invention.

In this embodiment, sensor capacitance varies as outer electrode 140 moves relative to inner electrode 180. Due to the movement of outer electrode 140, the area defined between the capacitive electrodes 140 and 180 varies over time. The capacitance, C, of the sensor capacitor, in picofarads, is given as:

$$C = \frac{K\varepsilon_o A}{g}$$

where K is the dielectric constant of air (1), $\varepsilon_o$ is the permittivity of free space (8.85 picofarads/meter), A is the area (m²) defined between the electrodes of the capacitor and g (m) is the nominal air gap between the electrodes.

With the particular geometric construction of the capacitive position sensor as described above, this becomes:

$$C = \frac{K\varepsilon_o \pi DL * 10^{-3}}{g} \text{ (picofarads)}$$

where D is the nominal diameter of the capacitor area (mm²) and L is the nominal length of the capacitor area (mm).

According to the teachings of the present invention, and as described above, in one exemplary embodiment, the nominal diameter of the capacitor area, L, is 24 mm (the outside diameter of fixed electrode 180), the nominal length of the capacitor area is 20 mm (the midpoint overlap between fixed electrode 180 and outer electrode 140), and the nominal air gap, g, between outer electrode 140 and fixed electrode 180 is 0.25 mm. This results in a capacitance, $C_o$=33.5 pF at the midpoint engagement between the electrodes (i.e. when there is a 20 mm overlap, L=20 mm). Further, at full engagement with an overlap of 30 mm, $C_{max}$=50 pF. Similarly, at full disengagement, with an overlap of 10 mm, $C_{min}$=16.8 pF.

Thus, it can be seen that the capacitance range according to one embodiment of the invention ranges from a value of approximately 16.8 pF at full disengagement to approximately 50.3 pF at full engagement. With a midrange capacitance of approximately 33.5 pF, it becomes necessary to sense relatively small changes in capacitance values (i.e. approximately +/−17 pF) in order to accurately sense position and apply the necessary control algorithms based upon those position measurements.

According to the present invention, these relatively small capacitance values may be measured and acted upon through the use of various techniques, circuitry and methodologies which suppress stray capacitance, allow accurate readings to be obtained and permit satisfactory system control. Those techniques and related methodologies are now discussed.

Various embodiments of the "signal conditioning" methodologies and related circuitry exist for use in connection with the capacitive position sensor of the present invention as well as for other purposes. While the signal conditioning methodologies now described are described in the context of processing a capacitance value generated as a result of the position sensor function of the present invention, the signal conditioning teachings herein made be used in connection with a great many other applications as will be apparent to one of skill in the art.

The basis for the need for signal conditioning in connection with the position sensor of the present invention is now described. The primary reason that signal conditioning is required is to produce an electrical signal, e.g., a voltage, which is proportional to the sensing capacitance while simultaneously suppressing error which would otherwise arise due to stray capacitance within the system and structural components which have unintended and/or undesirable capacitive properties. These stray capacitances can cause errors associated with position sensing which range from minor to fatal for the purposes of making position measurements and/or controlling engine operation. Further, the amount of these stray capacitances themselves tends to fluctuate over time due to, for example, component movement within assembly 100. One type of stray capacitance results from the capacitance between the conductors of the cable which may be provided to link the capacitive sensor contained within the sealed pressure vessel of a free piston Stirling engine alternator unit with external signal conditioning circuitry. The capacitance of even a short length of such cable might exceed the maximum sensing capacitance value.

Further, in the context of the position sensor arrangement described above and with respect to the piston/alternator assembly 100, moving electrode 140 is effectively grounded to the structure of assembly 100 (there is no metal to metal contact as is described below). The piston 140 and cylinder have non-conducting coatings such as a Teflon® coating or a Xylan® coating on the piston and a hard-coat finish on cylinder 150 to provide self-lubricating properties. In this case, moving electrode 140 is effectively grounded to the structure of assembly 100 due to the very large capacitance between the piston 140 and cylinder 150 which may be 100 times or greater than the maximum value of the sensor capacitance. Hence the very high impedance of the small sensor capacitance, which is in series connection with the much larger piston-cylinder capacitance, principally governs the current which flows through the sensor resulting in no or negligible measuring error.

On the other hand, fixed electrode 180 may create stray capacitance to ground, the potential error inducing effect of which is mitigated by the present invention. Fixed electrode 180 is not grounded as with moving electrode 140 and, as a result, capacitance exists between fixed electrode 180 and various surrounding components and structures within piston/alternator assembly 100. One such structure is, for example, alternator housing 175.

As alluded to above, guard electrode 120 is used to block any capacitive path between fixed electrode 180 and any other grounded structure such as end cap 195. Guard electrode 120 interrupts any potential leakage path by interposing a metallic shield between fixed electrode 180 and various other structures within assembly 100. As discussed below with respect to the various signal conditioning circuits, guard electrode 120 is driven during operation at a potential which is the same potential as that of fixed electrode 180. As a result, no current can flow and the resulting effective capacitance is essentially zero.

A first embodiment of the signal conditioning methodologies of the present invention uses variable current detection in order to generate a signal which may be used for control purposes in connection with, for example, piston and/or displacer movement within a Stirling engine. This embodiment is described in connection with FIG. 4. It is assumed for the purposes of the following discussion that the output signal generated may be a continuous analog voltage proportional to capacitance and hence piston position which is made available to a processor such as an analog to digital converter (ADC) input of a mixed signal digital signal processor (DSP) such as a Texas Instruments TMS320LF2407A or Analog Devices ADMC401 for control and other purposes as is known in the art. The DSP can also be used to generate the sensor excitation carrier wave as is described below or the signal may be sourced from another device.

Figure 4:
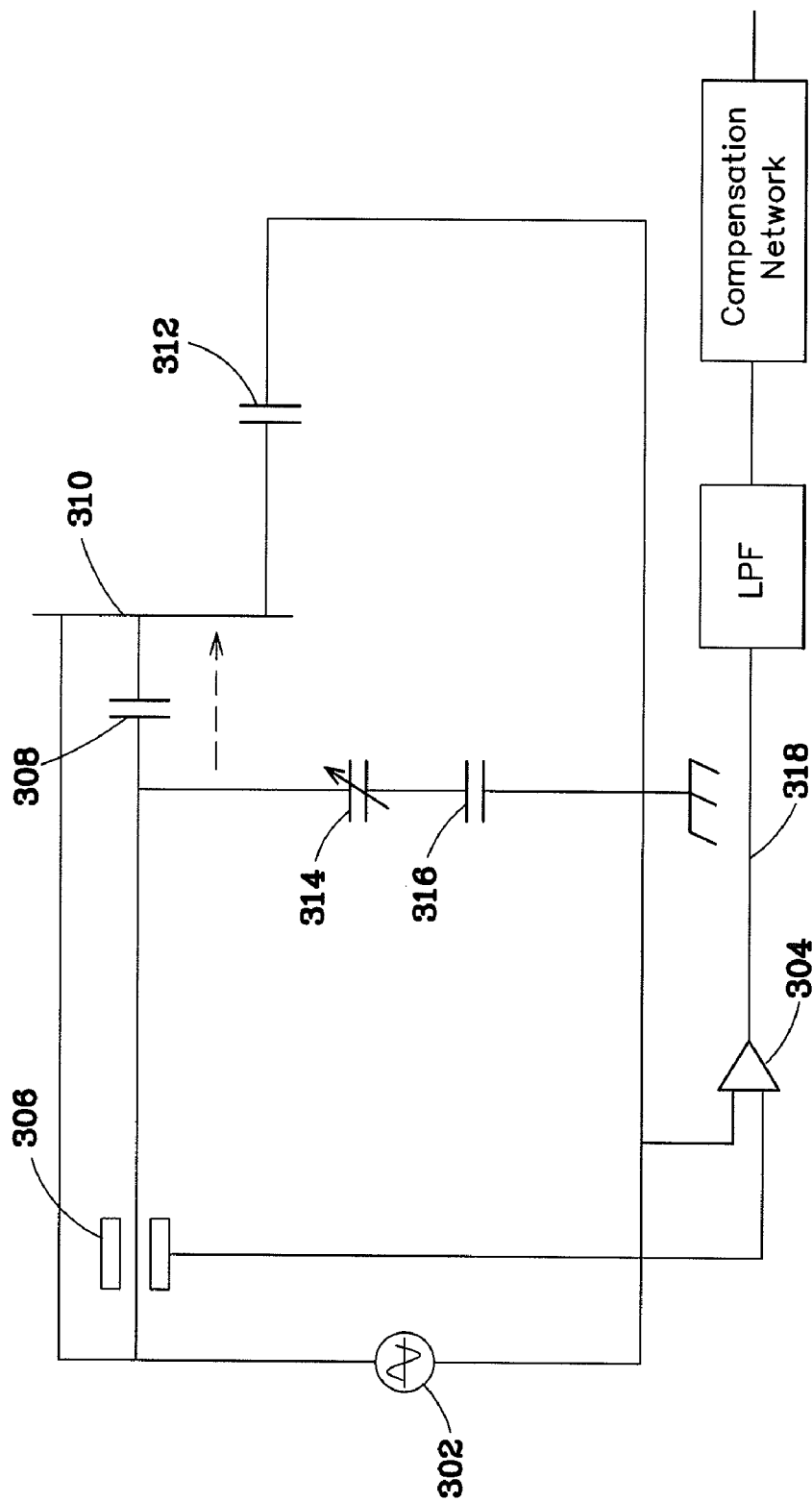
FIG. 4 is a circuit diagram of an electrical circuit which is used for signal conditioning using variable current detection with constant voltage according to one preferred embodiment of the present invention.

Referring now specifically to FIG. 4 one particular circuit for signal conditioning using variable current detection is shown. This arrangement effectively permits the relatively small changes in capacitance (approximately +/−17 pF) resulting in the sensing structure described above to be processed with the aid of a "driven" guard shielding technique as described below to yield a continuous analog voltage proportional to the sensor capacitance and not materially influenced by the previously described stray capacitances. This technique functions to suppress stray shunt capacitance including that of any shielded wiring which is present. In this embodiment, a constant amplitude triangle wave voltage source 302 provides the excitation for the circuit. The sensing capacitor 314, which is comprised of fixed electrode 180 and moving electrode 140, is in series with the fixed piston to cylinder capacitance 316 described above. As mentioned above, this capacitance is essentially grounded and does not cause stray capacitance error. Voltage source 302 is in parallel with the series connection of both sensing capacitor 314 and piston-cylinder capacitor 316. Guard electrode 120 presents a capacitance 308 to the fixed electrode of sensor capacitor 314 and a capacitance 312 to neighboring grounded structures. Capacitance 312 is connected directly across the terminals of the excitation source 302 and has no impact on the reliability or accuracy of the measurement process.

Because both sides of guarded leakage capacitor 308 are maintained at the same potential, no current flows through guarded leakage capacitor 308 and capacitance is therefore effectively zero.

AC current sensor 306 may be, for example, a Coilcraft T6522-A surface mount current sensing transformer. AC current sensor 306 is placed between voltage source 302 and sensing capacitor 314 in order to sense current flowing through sensing capacitor 314. Further, signal amplifier 304 receives a signal from AC current sensor 306. Because current sensor 306 is galvanically isolated from the circuit, the amplifier may be ground referenced to simplify further signal processing steps and the ultimate interconnection of the position indicating signal to the DSP. An output signal reflecting an amplified current signal and which may be used by the control processor (not shown) appears at output node 318. As a result of the above described arrangement a square wave output signal with current amplitude proportional to the capacitance of sensing capacitor 314 appears at output node 318. The output signal is time variant and, when based upon use of the Stirling engine/alternator and position sensor arrangement described above, will reflect the relative position of piston 130 over time. The absolute value of the output square wave may be taken and position may also be read on that basis. It is also possible to use a variety of other modulating signals in connection with this embodiment. For example, voltage source 302 may provide a sine wave modulation signal which would result in a sine wave output signal at output node 318, the peak amplitude of which, detected by full wave rectification and subsequent low pass filtering methods well-known in the signal processing art, serves as a measure of the sensing capacitor current, capacitance and hence the position of the moving electrode 140.

Figure 5:
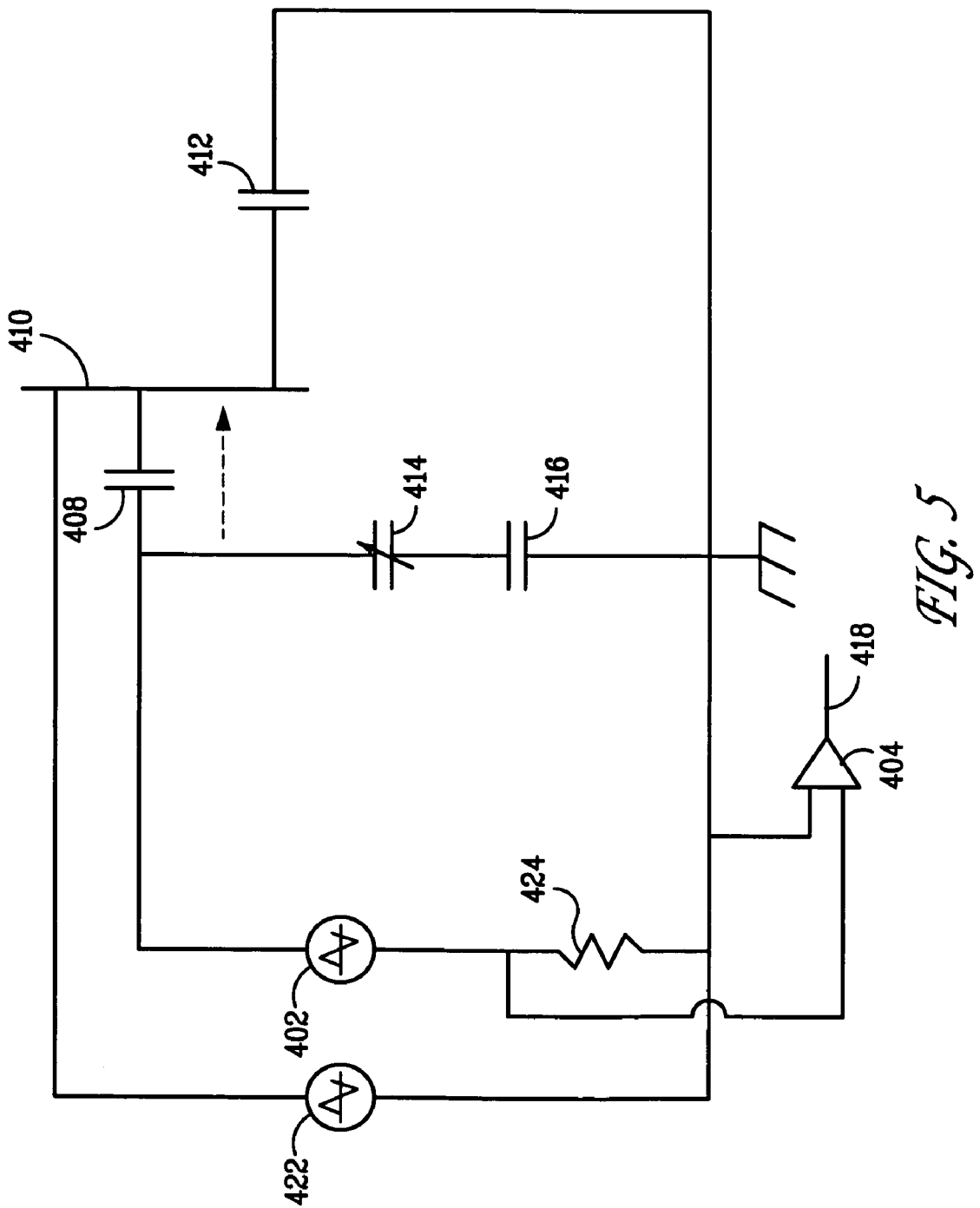
FIG. 5 is a circuit diagram of an electrical circuit which is used for signal conditioning using variable current detection with constant voltage according to another preferred embodiment of the present invention.

FIG. 5 is an illustration of an alternative circuit for use in signal conditioning prior to control processing. This circuit also employs constant voltage to generate and detect a variable current associated with the sensing capacitor. While this embodiment requires two voltage sources as discussed below, it eliminates the need for AC current sensor 306. To the extent that AC current sensor 306 from the FIG. 4 embodiment may add a significant unguarded stray capacitance to the circuit, this error can be generally eliminated via the FIG. 5 embodiment which is next described.

The embodiment of FIG. 5 is generally similar to that of FIG. 4 except that AC current sensor 306 is replaced by ground reference shunt resistor 424 and a second excitation voltage source 422 is added to drive guard shield 410 instead of using a single voltage source to drive both the guard shield and the sensing capacitor as in the FIG. 4 embodiment. Voltage source 402 must be isolated from ground to enable insertion of ground referenced shunt resistor 424. A small transformer may be used to accomplish this isolation provided it is fitted with a guard shield between the primary and secondary (output) windings and core. This guard shield can be driven by voltage source 422 along with guard shield 410 and the interconnecting cable shield. The guard driving source 422 is ground referenced and requires no isolation. According to the FIG. 5 embodiment, a constant amplitude triangle wave voltage source 402 provides the excitation signal for the circuit. The sensing capacitor 414, which is comprised of fixed electrode 180 and moving electrode 140, is in series with the fixed piston to cylinder capacitance 416 described above. As mentioned above, this capacitance is much larger than the maximum value of the sensor capacitance and does not, therefore, significantly disturb the measurement process. Voltage source 402 is in parallel with both sensing capacitor 414 and piston-cylinder capacitor 416. Guard electrode 120 which also includes the shield of the sensor to signal processor interconnecting cable is directly connected to guard electrode voltage source 422 and thereby suppresses the leakage capacitance 408 between fixed electrode 180 and electrically driven cable and sensor guard shield 410.

Because both sides of guarded leakage capacitor 408 are at the same potential, no current flows through guarded leakage capacitor 408 and capacitance is therefore effectively zero. A further capacitive structure 412 exists between guard shield 410 and ground. Since this capacitance appears across voltage source 402, however, the capacitance is of no consequence to the reliability and accuracy of the sensing methodology. This calls to attention the reason for the separate guard driving voltage source 422 which is able to source current flow through leakage capacitance 412 without contaminating the sensing current in shunt resistor 424.

The signal voltage developed across ground referenced shunt resistor 424 is coupled to the input of ground referenced amplifier 404. The amount of voltage drop across ground reference shunt resistor is small so that it may be assumed that the guard voltage from voltage source 422 and the sensor voltage from voltage source 402 are essentially the same. The voltage cross ground reference shunt resistor 424 may be monitored over time. This, in turn allows the calculation of the current flowing through ground reference shunt resistor 424 and, effectively, the capacitance of sensor 414. The resulting signal is amplified by signal amplifier 404.

An output signal reflecting an amplified current signal and which may be used by the control processor (not shown) appears at output node 418. As a result of the above described arrangement a square wave output signal with current amplitude proportional to the capacitance of sensing capacitor 414 appears at output node 418. The output signal is time variant and, when based upon use of the Stirling engine/alternator and position sensor arrangement described above, will reflect the relative position of piston 130 over time. The absolute value of the output square wave may be taken and position may also be read on that basis. It is also possible to use a variety of other modulating signals in connection with this embodiment. For example, voltage source 402 may provide a sine wave modulation signal which would result in a sine wave output signal at output node 418, the peak amplitude of which, detected by full wave rectification and subsequent low pass filtering methods well-known in the signal processing art, serves as a measure of the sensing capacitor current, capacitance and hence the position of the moving electrode.

Figure 6:
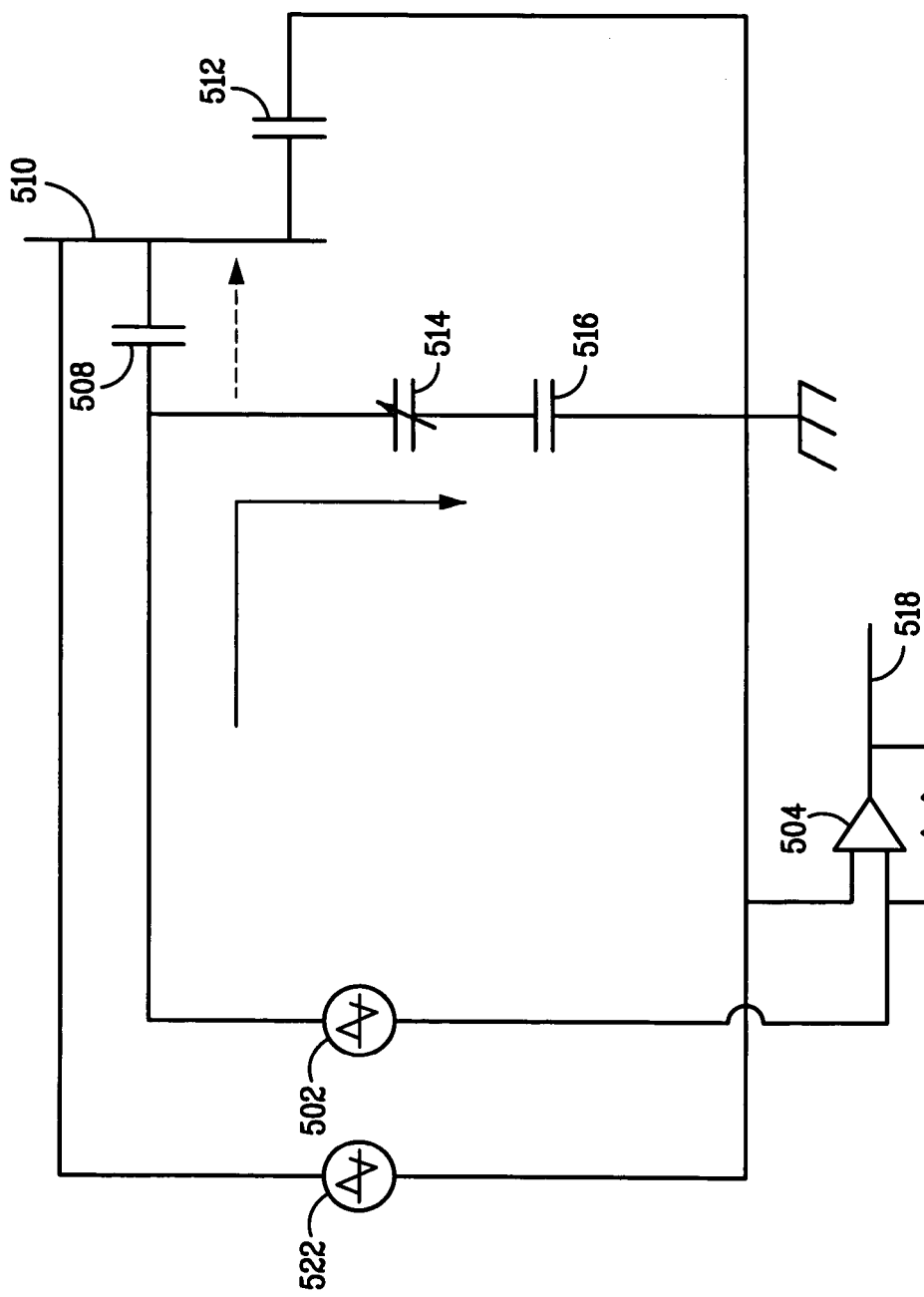
FIG. 6 is a circuit diagram of an electrical circuit which is used for signal conditioning using variable current detection with constant voltage according to another preferred embodiment of the present invention.

Yet another embodiment of the signal conditioning methodologies of the present invention is now described in connection with FIG. 6. This embodiment is similar to the embodiment described in connection with FIG. 5 except that ground reference shunt resistor 424 is eliminated and is replaced by a transimpedance amplifier configuration which is instead used to monitor sensor current. This embodiment derives its advantages from the fact that, although small and in most cases negligible, the voltage drop across ground reference shunt resistor 424 is eliminated since ground reference shunt resistor 424 is eliminated from the circuit. As is apparent from FIG. 6, a feedback resistor 526 is used in connection with operational amplifier 504. Feedback resistor 526 ensures that no net current flows into the summing junction of operational amplifier 504. By using feedback resistor 526 and by connecting voltage source 502 to the summing junction input of operational amplifier 504, it is ensured that all current flows into the summing junction of operational amplifier 504 creating an effective virtual ground. By monitoring the current into and out of the summing junction of operational amplifier 504 indicated by its output voltage, the effective capacitance of variable sensor 514 may be determined.

Figure 7:
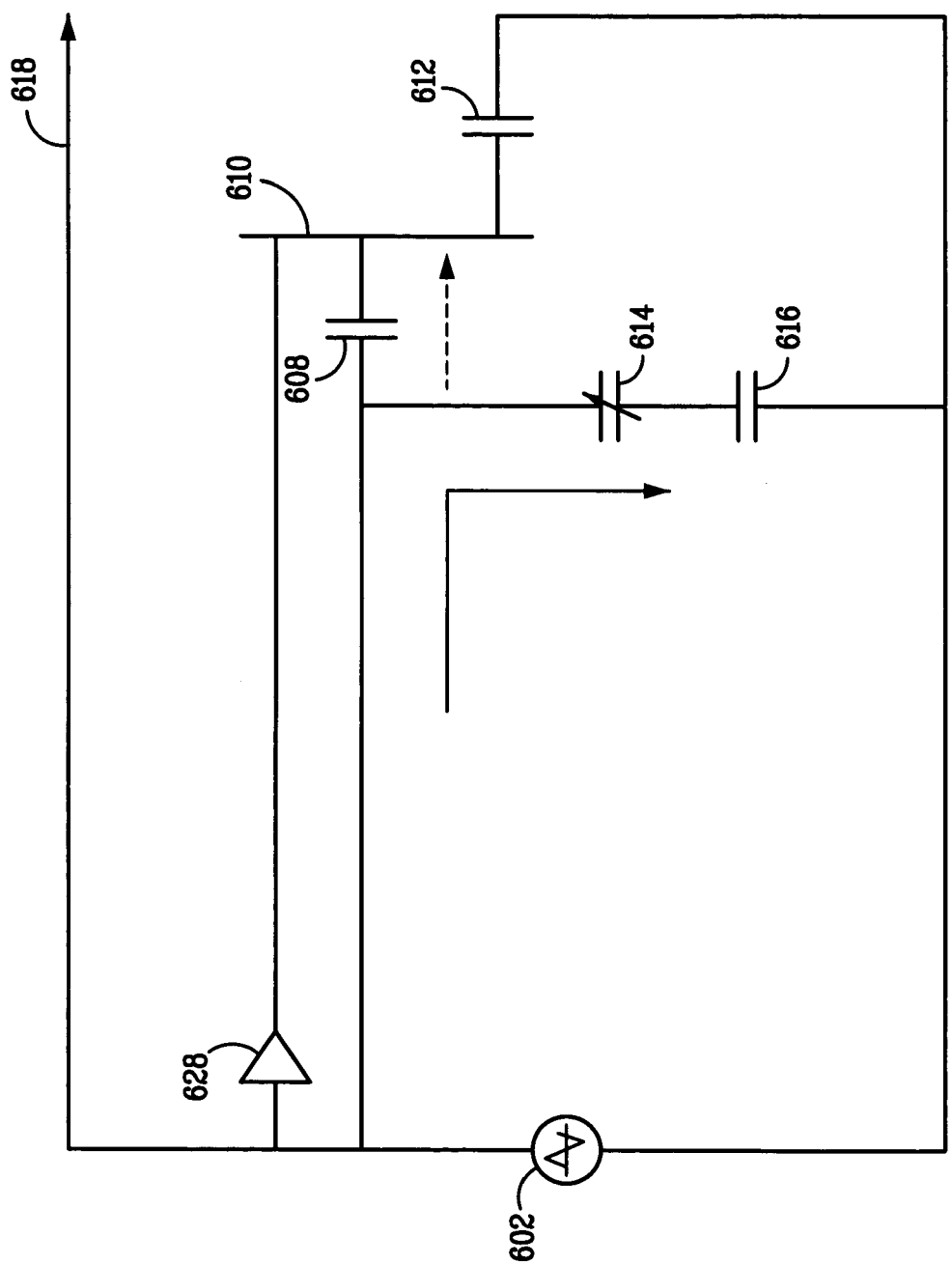
FIG. 7 is a circuit diagram of an electrical circuit which is used for signal conditioning using variable voltage detection with constant current according to another preferred embodiment of the present invention.

In another embodiment of the present invention as illustrated by FIG. 7, a constant current, variable voltage circuit is used to obtain an output signal indicative of the capacitance of sensor 614. According to this embodiment, a constant amplitude square or sine wave current source 602 replaces a voltage source from the previous embodiments. Voltage follower 628 generates a guard driving voltage equal to the voltage developed by the constant current source and is necessary to ensure that the guard shield voltage stays at essentially the same potential as the potential of current source 602 (i.e. the voltage difference across capacitor 608 is essentially zero). The voltage developed by the current source required to attain a fixed amplitude of current flow through the sensor capacitance is inversely proportional to the sensor capacitance value. Position of the reciprocating member is indirectly determined by the variable voltage across sensor capacitor 614. The analog signal output appearing at output point 618 is inversely proportional to the capacitance of sensor capacitor 614 and thus to the position of the reciprocating member. It will be understood by one of skill in the art that since the relationship between sensor capacitance and voltage variance is a non-linear function, this embodiment does not achieve all of the advantages of the invention as described above and this embodiment is generally not the most preferable. However, it will also readily be understood that a digital signal processor, for example, could be used to implement transfer function linearization in order to address any difficulties.

It will be understood by one of skill in the art that various additional signal conditioning techniques may be applied to the output signal resulting from circuits fashioned according to the various embodiments described above. For example, the sensor and guard may be driven with sinusoidal excitation ("carrier") voltages and a full wave rectifier, followed by a low pass filter, may then be used to process the output signal to recover the carrier envelope amplitude indicative of the position of moving electrode 140. To the extent that this is done, a low pass filter such as a second order Butterworth LPF should be used to attenuate high order demodulation components leaving only the carrier envelope signal ("baseband") component indicative of sensor current and hence the position of moving electrode 140.

In connection with fast moving reciprocating members such as pistons and displacers in free piston Stirling and internal combustion engines, position measurement phase lag can also be a problem when it is critical to know instantaneous positioning, such as in the case of engineering performance evaluation. In these cases, the signal processing circuitry may include a phase lead network to compensate for the low pass filter phase lag. For example, phase lag compensation is desirable in particular during system tuning. In this case, real-time observations of instantaneous piston position with respect to the instantaneous pressure wave amplitude and displacer position are necessary to tune the system. After tuning, position sensing does not require phase information. Other applications, however, may benefit from phase lag compensation via a phase lead network.

With respect to low pass filter design as used with the signal conditioning circuits disclosed herein for the illustrative purpose of monitoring the position of a free piston Stirling engine power piston, it will be understood that sensor capacitance variation will be a simple harmonic over a frequency range of zero to a nominal operating frequency $f_b$ of 80 Hz. As such, the output of the full wave rectifier envelope detector will contain the desired baseband information signal and undesired high order demodulation components of $2nf_c+/-f_b$ where n=1, 3, 5 . . . with corresponding amplitudes declining as 1/n. By setting the excitation "carrier" signal frequency $f_c$>>80 Hz, a large frequency "space" between the baseband signal spectrum (0 to $f_b$) and the high order demodulation components can be provided. This allows the low pass filter to isolate the capacitance variation information signal in the 0 to $f_b$ baseband region without introducing significant magnitude or phase error.

By its nature, the filter will introduce a small phase lag in the 0 to $f_b$ baseband region but, as discussed above, this can be suppressed, if desired, through the introduction of a phase lead network. The LPF and phase lead network, if included, will also introduce some amplitude response variation in the range of 0 to $f_b$ which can be made acceptable small through the proper choice of LPF "corner" frequency and phase lead network design.

A capacitive sensor structure and signal processing methodology has been disclosed. It will be understood that the teachings provided above have a great many applications particularly to position sensing applications associated with reciprocating members. While the above discussion has been provided in the context of a reciprocating member for a Stirling engine which moves linearly, other applications are possible and the teachings herein are not necessarily limited to Stirling engines or to linearly moving reciprocating members. For example the sensor herein may be used in various applications including various free piston applications such as with Stirling engines or with compressors or internal combustion engines. In addition and although the focus of the disclosure above has been on monitoring the position of reciprocating mechanisms, the same area modulated capacitive sensor concept may be applied in connection with sensing rotational movement by, for example, employing one or more fixed and rotating plates similar to the variable capacitors once widely used for adjusting the resonance frequency of radio tuning circuits.

While the subject invention has been illustrated and described in detail in the drawings and foregoing description, the disclosed embodiments are illustrative and not restrictive in character. All changes and modifications that come within the scope of the invention are desired to be protected.

What is claimed is:

1. A sensor for determining the position of a reciprocating member, said sensor comprising:
    a fixed electrode support structure comprising a fixed electrode and a guard electrode, said fixed electrode being electrically isolated from said guard electrode; and
    a movable electrode, said movable electrode positioned to move in direct proportion to the movement of said reciprocating member;
    wherein said fixed electrode and said movable electrode form a capacitive structure, said capacitive structure having a variable capacitance which is directly proportional to the instantaneous position of said reciprocating member;
    wherein said fixed electrode and said movable electrode are cylindrical in shape; and
    wherein said fixed electrode is formed from plastic and further comprises at least one area of conductive plating.

2. The sensor of claim 1 wherein said movable electrode is structurally and electrically in contact with a piston of an engine.

3. The sensor of claim 2 wherein said engine is a free piston Stirling engine.

4. The sensor of claim 3 wherein said piston drives a linear alternator.

5. The sensor of claim 3 wherein said piston drives a compressor.

6. The sensor of claim 2 wherein said engine is a free piston internal combustion engine.

7. The sensor of claim 1 wherein said movable electrode is structurally and electrically in contact with a displacer of a Stirling engine.

8. The sensor of claim 1 wherein said movable electrode comprises a sleeve or an alternator.

9. The sensor of claim 1 wherein said variable capacitance results from a variance in the amount of overlap between said fixed electrode and said movable electrode.

10. The sensor of claim 1 wherein said movable electrode and said fixed electrode are positioned co-axially and wherein said movable electrode selectively slides over said fixed electrode.

11. A sensor for determining the position of a reciprocating member, said sensor comprising:
    a fixed electrode support structure comprising a fixed electrode and a guard electrode, said fixed electrode being electrically isolated from said guard electrode; and
    a movable electrode, said movable electrode positioned to move in direct proportion to the movement of said reciprocating member;
    wherein said fixed electrode and said movable electrode form a capacitive structure, said capacitive structure having a variable capacitance which is directly proportional to the instantaneous position of said reciprocating member;
    wherein said fixed electrode and said movable electrode are cylindrical in shape; and
    further comprising a phase lead compensation network for correcting low-pass filter phase lag.

12. A capacitive position sensor comprising:
    a fixed electrode support structure comprising a fixed electrode and a guard electrode, said fixed electrode being electrically isolated from said guard electrode; and
    a movable electrode, said movable electrode positioned to move in direct proportion to the movement of a reciprocating member;
    wherein said guard electrode is driven at a potential which is the same as that of said fixed electrode; and
    wherein said fixed electrode and said movable electrode are cylindrical in shape; and
    wherein said guard electrode and said fixed electrode are driven by a constant voltage source generating a constant amplitude triangle modulating wave.

13. The position sensor of claim 12 wherein said position sensor is embodied in a free piston Stirling engine.

14. The position sensor of claim 13 wherein said free piston Stirling engine drives a linear alternator.

15. The position sensor of claim 12 wherein said position sensor is embodied in a free piston internal combustion engine.

16. The position sensor of claim 12 further comprising a second constant voltage source and a ground referenced current sensing shunt resistor wherein said second constant voltage source drives said guard electrode rather than said first constant voltage source.

17. The position sensor of claim 12 further comprising a transimpedance amplifier module to monitor current.

18. The position sensor of claim 17 further comprising an AC current sensor said AC current sensor providing an input signal to a signal amplifier and said signal amplifier providing an output signal which is indicative of the capacitance between said fixed electrode and said movable electrode.

19. A capacitive position sensor comprising:
    a fixed electrode support structure comprising a fixed electrode and a guard electrode, said fixed electrode being electrically isolated from said guard electrode; and
    a movable electrode, said movable electrode positioned to move in direct proportion to the movement of a reciprocating member;

wherein said guard electrode is driven at a potential which is the same as that of said fixed electrode;

wherein said fixed electrode and said movable electrode are cylindrical in shape; and wherein said guard electrode and said fixed electrode are driven by a voltage source generating a constant amplitude sine modulating wave.

20. The position sensor of claim 19 further comprising a second constant voltage source and a ground referenced current sensing shunt resistor wherein said second constant voltage source drives said guard electrode rather than said first constant voltage source.

21. The position sensor of claim 19 further comprising a transimpedance amplifier module to monitor current.

22. The position sensor of claim 19 wherein said position sensor is embodied in a free piston Stirling engine.

23. The position sensor of claim 22 wherein said free piston Stirling engine drives a linear alternator.

24. The position sensor of claim 19 wherein said position sensor is embodied in a free piston internal combustion engine.

25. A capacitive position sensor comprising:

a fixed electrode support structure comprising a fixed electrode and a guard electrode, said fixed electrode being electrically isolated from said guard electrode; and a movable electrode, said movable electrode positioned to move in direct proportion to the movement of a reciprocating member;

wherein said guard electrode is driven at a potential which is the same as that of said fixed electrode;

wherein said fixed electrode and said movable electrode are cylindrical in shape; and further comprising a constant amplitude current source and a voltage follower, said voltage follower adjusting voltage to ensure that the potential at said guard electrode is essentially the same as the potential at said current source.

26. A capacitive position sensor comprising:

a fixed electrode support structure comprising a fixed electrode and a guard electrode, said fixed electrode being electrically isolated from said guard electrode; and a movable electrode, said movable electrode positioned to move in direct proportion to the movement of a reciprocating member;

wherein said guard electrode is driven at a potential which is the same as that of said fixed electrode;

wherein said fixed electrode and said movable electrode are cylindrical in shape; and further comprising a phase lead compensation network for correcting low-pass filter phase lag.

* * * * *